June 17, 1924.
M. E. WIDELL
BALING PRESS
Filed April 9, 1921
1,498,414
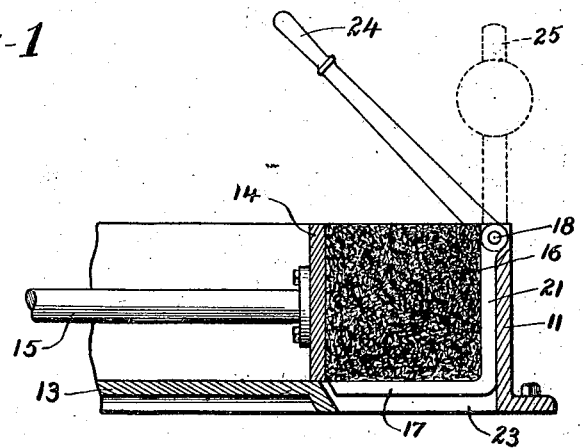
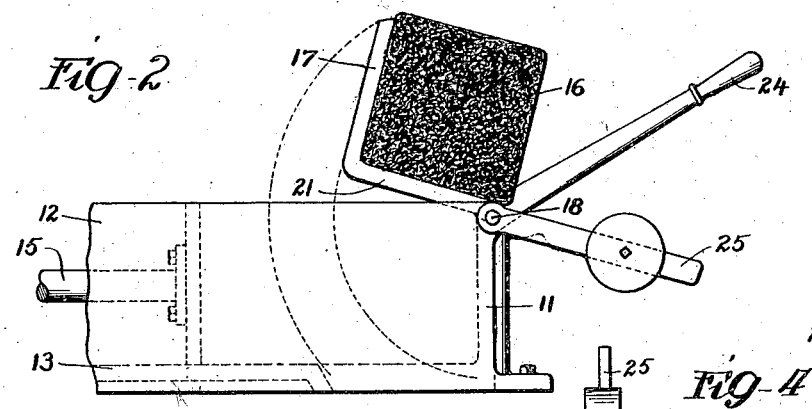
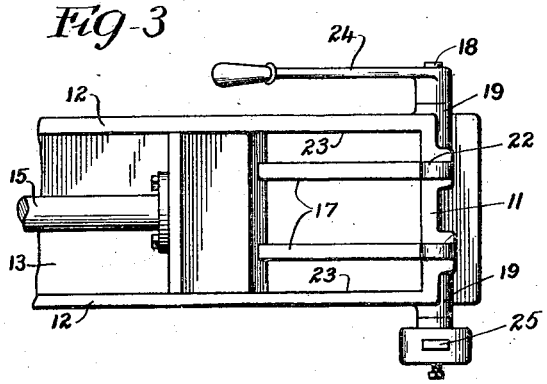
Inventor
Magnus E. Widell
By: Munday, Clarke & Carpenter Attys Patented June 17, 1924.

1,498,414

UNITED STATES PATENT OFFICE.

MAGNUS E. WIDELL, OF MAYWOOD, ILLINOIS, ASSIGNOR TO AMERICAN CAN COMPANY, OF NEW YORK, N. Y., A CORPORATION OF NEW JERSEY.

BALING PRESS.

Application filed April 9, 1921. Serial No. 459,967.

*To all whom it may concern:*

Be it known that I, MAGNUS E. WIDELL, a citizen of the United States, residing in Maywood, in the county of Cook and State of Illinois, have invented a new and useful Improvement in Baling Presses, of which the following is a specification.

While this invention relates more particularly to baling presses it will be manifest that it has valuable application in many other connections.

The invention will be hereinafter described in connection with a baling press for tin and sheet metal scrap and in baling materials of this character a large quantity of loose scrap is thrown into a chamber and the individual pieces thereof compacted and intermingled and interwoven by the action of the plunger in compressing. These bales are heavy and the edges of the metal of course sharp. The removal of these heavy bales with a multitude of sharp edges from the chamber in which the baling has been accomplished has proven a hard unpleasant task.

My present invention contemplates a mechanism of simple operation for swinging the bales up into a dumping position or into a position from which they may be more readily lifted or removed than is possible where the operator must reach into the chamber and manually remove them.

Another important object of the invention is the accomplishment of this result without effecting materially the action of the baling press or weakening any of its component parts or structures.

Another object of the invention is the provision of an apparatus of this character consisting only of a few sturdy rigid parts, none of which are likely to require repair or replacement during the life of the press in which they are incorporated.

Numerous other objects and advantages of the invention will be apparent as it is better understood from the following description, which, taken in connection with the accompanying drawings, discloses a preferred embodiment thereof.

Referring to the drawings,

Figure 1 is a vertical section taken through a portion of a bailing press;

Fig. 2 is a side elevation of the same showing the bale lift;

Fig. 3 is a top plan view of the same without the bale, and

Fig. 4 is an end view thereof.

For the purpose of illustrating my invention I have shown a part of a tin scrap baling press. On the drawing reference character 11 indicates the front wall, reference character 12 the side vertical walls and reference character 13 the bottom wall. These walls may have any preferred construction and relative arrangement. Movable within this chamber is a plunger 14 actuated by a plunger rod 15 from any suitable source of power. The scrap is dumped in when the plunger is retracted and forward movement of the plunger presses it into the bale 16 shown in Figs. 1 and 2. I arrange to swing up a part of the bottom wall after the bale has been completed from a position at the bottom to lift the bale as shown in Fig. 2. In the present instance this portion of the bottom wall consists of the free legs 17 of angle members fast at their ends upon a cross shaft 18 having bearings at 19 along the top of the front wall 11. The other legs 21 of these angle members extend down along the inside of the front wall 11 during the formation of the bale and may be considered at this time a part thereof since the front wall is preferably recessed at 22 for their reception. The legs 17 are let into the bottom wall at 23 when the bale lifting device is in bale receiving position.

A hand lever 24 is fast at one end of the shaft 18 and the counterweight arm 25 on the other. After the bale has been compressed it is only necessary to withdraw the plunger and swing the arm 24 in a clockwise direction, viewing Fig. 1, to lift the bale out of the chamber and up and over into a position from which it may be dumped by pushing or lifting off by hand or in any other fashion.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a baling press and the like, the combination of a chamber in which the subject matter is operated upon, angle arms extending down at an end of and within said chamber and along its bottom, said angle arms being rotatable to lift the subject matter after the operation upon it out of the chamber and into an accessible position.

2. In a baling press and the like, the combination of a chamber having a plurality of confining walls, a plunger movable to compress the subject matter into a bale and angle members extending down along the said wall and along the bottom of said chamber and beneath the pressed bale, said angle members being rotatable about a pivotal axis to move the bale out of the chamber and to an accessible position.

3. In a baling press and the like, the combination of a chamber having a plurality of confining walls, a plunger movable to compress the subject matter into a bale and angle members extending down along the said wall and along the bottom of said chamber and beneath the pressed bale, said angle members being pivoted at the top of the chamber to lift the bale out of the chamber and to an accessible position.

4. In a baling press and the like, the combination of a plurality of confining walls, a bottom wall, a baling plunger, a part of said bottom wall being connected to and movable about a pivotal axis at the top of the chamber to lift the bales out of said chamber to an accessible position.

5. In a baling press and the like, the combination of a plurality of confining walls, a bottom wall, a baling plunger, a part of said bottom wall being connected to and movable about a pivotal axis at the top of the chamber to lift the bales out of said chamber to an accessible position, and a lever arranged without the chamber for manipulating said bale lifting part of the bottom wall.

6. In a baling press and the like, the combination of fixed vertical end and side confining walls, means for compressing the subject matter therein, and means pivoted adjacent the top of one of said walls for swinging the bale about this pivot axis to an accessible position.

MAGNUS E. WIDELL.